US006957726B2

(12) United States Patent
Gehrs

(10) Patent No.: US 6,957,726 B2
(45) Date of Patent: Oct. 25, 2005

(54) FLOATING BRAKE ROTOR ASSEMBLY WITH NON-LOAD BEARING PINS

(76) Inventor: Jeffrey W. Gehrs, 22465 Spur Brook Dr., Wildomar, CA (US) 92595

( * ) Notice: Subject to any disclaimer, the term of this patent is extended or adjusted under 35 U.S.C. 154(b) by 0 days.

(21) Appl. No.: 10/686,708

(22) Filed: Oct. 17, 2003

(65) Prior Publication Data

US 2005/0082125 A1 Apr. 21, 2005

(51) Int. Cl.[7] .............................................. F16D 65/12

(52) U.S. Cl. ............................ 188/218 XL; 188/18 A; 188/218 A; 188/264 AA

(58) Field of Search ...................... 188/218 XL, 18 A, 188/71.6, 26, 264 A, 264 AA, 58, 59; 301/105.1, 301/6.3, 6.8; D12/180; 192/70.17, 70.2, 192/70.19

(56) References Cited

U.S. PATENT DOCUMENTS

| | | | | |
|---|---|---|---|---|
| 1,708,484 | A * | 4/1929 | Nelson | 384/487 |
| 4,848,521 | A | 7/1989 | Izumine | |
| 5,190,124 | A * | 3/1993 | Haneda | 188/218 XL |
| 5,520,269 | A | 5/1996 | Yamamoto et al. | |
| 5,921,633 | A | 7/1999 | Neibling et al. | |
| 6,267,210 | B1 | 7/2001 | Burgoon et al. | |
| 6,305,510 | B1 | 10/2001 | Bunker | |
| 6,374,956 | B1 | 4/2002 | Naeumann et al. | |
| 6,745,875 | B2 * | 6/2004 | Wirtanen | 188/218 XL |
| 2004/0178031 | A1 * | 9/2004 | Gotti et al. | 188/218 XL |

FOREIGN PATENT DOCUMENTS

| | | | |
|---|---|---|---|
| DE | 19726674 | * | 1/1998 |
| EP | 0085361 | * | 8/1983 |
| EP | 959261 | * | 11/1999 |
| GB | 1080035 | * | 8/1967 |
| GB | 2150263 A | | 6/1985 |
| JP | 61-241538 | * | 10/1986 |
| JP | 9-166168 | * | 6/1997 |
| JP | 2002-227891 | * | 8/2002 |
| WO | WO 95/00771 | * | 1/1995 |
| WO | WO 03/002886 | * | 1/2003 |
| WO | WO 03/064882 | * | 8/2003 |

* cited by examiner

*Primary Examiner*—Douglas C. Butler
(74) *Attorney, Agent, or Firm*—Richard C. Litman

(57) ABSTRACT

The floating brake rotor assembly with non-load bearing pins includes a brake rotor and hub that are coplanar and are interconnected by pin and spring assemblies such that the pins do not bear rotational torque being transferred between the brake rotor and hub. The rotor has tooth-like protruding members along its inner edge that mate with recesses along the outer edge of the hub. When aligned, each protruding member and corresponding recess forms an aperture through which a pin is positioned, and allows for transfer of rotational torque without applying load force to the pin.

13 Claims, 7 Drawing Sheets

FLOATING BRAKE ROTOR ASSEMBLY WITH NON-LOAD BEARING PINS

BACKGROUND OF THE INVENTION

1. Field of the Invention

The present invention relates to disc brake assemblies, and more particularly to a floating brake rotor assembly in which the connecting pins are not subject to torque forces transferred from the brake rotor to the hub.

2. Description of the Related Art

Various designs for floating brake rotor assemblies have been proposed. Examples of such designs are provided by U.S. Pat. No. 4,848,521, issued Jul. 18, 1989 to Z. Izumine; U.S. Pat. No. 5,520,269, issued May 28, 1996 to S. Yamamoto et al.; U.S. Pat. No. 5,921,633, issued Jul. 13, 1999 to P. Neibling et al.; U.S. Pat. No. 6,267,210, issued Jul. 31, 2001 to D. L. Burgoon et al.; U.S. Pat. No. 6,305,510, issued Oct. 23, 2001 to K. J. Bunker; and U.S. Pat. No. 6,374,956, issued Apr. 23, 2002 to E. Naeumann et al.

In general, a floating brake rotor assembly is comprised of a brake rotor and a hub. The brake rotor is annular with two flat sides that provide surfaces to which brake pads can be applied. The hub provides a means for mounting the brake rotor to the wheel of a vehicle. The two sections are interconnected in a manner that allows the brake rotor to move, or "float," axially relative to the hub. One of the main advantages of a floating rotor is that binding of the rotor with a brake pad, due to heat distortion of the rotor, is minimized or avoided. Hence, as the rotor warps slightly due to thermal expansion, it floats relative to the brake pad.

Typically, the brake rotor and the hub are interconnected in one of two manners. In one manner, as taught by Yamamoto et al., and particularly referring to FIG. 1 thereof, the inner aspect of the brake rotor and the outer aspect of the hub have mating semi-circular indentations that form apertures through which a pin is passed to connect the rotor and hub. In the other manner, as taught by Burgoon et al., and particularly referring to FIG. 4 thereof, overlapping portions of the brake rotor and the hub have mating apertures that align to form a single continuous aperture through which a pin or bolt is passed.

Significantly, in each of the aforementioned manners for interconnecting a brake rotor and a hub, the load transfer between the two components is transferred solely across the connecting pins. Consequently, several known problems are associated with each manner. First, because load thrust transfer must occur across a relatively small surface area, localized wear and deformation of the brake rotor, hub and pins occur frequently. Second, the maximum load transfer between the brake rotor and the hub is constrained by the load capacity of the pins. Third, thermal transfer capacity from the brake rotor to the hub is constrained, thereby lessening heat dissipation and increasing the likelihood of thermal induced distortion of the brake rotor.

U.S. Pat. No. 4,848,521, issued to Z. Izumine; U.S. Pat. No. 5,921,633, issued to P. Neibling et al.; and U.S. Pat. No. 6,267,210, issued to Burgoon et al. each teach a rotor and hub assembly wherein the rotor and hub are connected by a number of pins that pass through apertures in overlapping portions of the rotor and the hub, with the pins being oriented parallel to the axis of rotation. As discussed above, this configuration results in the entire load transfer between the rotor and hub being transferred via the pins and further results in the aforementioned problems.

On the other hand, U.S. Pat. No. 5,520,269, issued to S. Yamamoto et al., and U.S. Pat. No. 6,305,510, issued to K. J. Bunker, each teach a rotor and hub assembly wherein corresponding semicircular indentations along the inner edge of the rotor and the outer edge of the hub mate to form apertures through which pins secure the rotor and hub together. However, this configuration also results in the entire load transfer between the rotor and hub being transferred via the pins. Additionally, Bunker uses a combined pin and leaf spring, which complicates assembly and replacement of the rotor.

U.S. Pat. No. 6,374,956, issued to E. Naeumann et al., teaches a brake rotor and hub assembly wherein the rotor and hub are connected in a non-coplanar configuration with an insulating layer between the two components. However, due to lateral torque forces, the non-coplanar configuration of the rotor and hub is more prone to produce warping and excessive wear.

U.K. Pat App. No. 2,150,263, published on Jun. 26, 1985, depicts a rotor and hub assembly wherein the rotor and hub are interconnected by a spring. The spring is planar and is disposed in a groove on the outer edge of the hub such that when a pin is passed though a shaft that intersects the groove, the ends of the spring extend into recessed areas on the inner edge of the rotor. This configuration requires precise placement of the spring groove, pin shaft, and recessed areas, and thus complicates manufacture, assembly and replacement of the components.

Consequently, none of the above inventions and patents, taken either singly or in combination, is seen to describe the instant invention as claimed. Thus, a floating brake rotor assembly solving the aforementioned problems is desired.

SUMMARY OF THE INVENTION

The floating brake rotor assembly with non-load bearing pins includes a brake rotor and hub that are coplanar and are interconnected by pin and spring assemblies such that the pins do not bear rotational torque being transferred between the rotor and the hub. The rotor has tooth-like protruding members along its inner edge that mate with recessess along the outer edge of the hub. When aligned, each protruding member and corresponding recess form an aperture through which a pin is positioned, and allows for transfer of rotational torque without applying load force to the pin. This coplanar configuration with pin apertures formed between the rotor and hub allows for ease in assembling and replacing the components.

Furthermore, the multiple tooth-like protruding members and corresponding recessess provide an increased thrust face surface area between rotor and hub, thereby enabling greater load transfer capacity (by as much as 500% as compared to prior art assemblies). By transferring load via the bearing faces of multiple protruding members and recesses, wear of rotor and hub is decreased; localized deformation is minimized; and thermal transfer capability of rotor to hub is increased, thereby improving heat dissipation and lessening thermal induced distortion of the rotor.

Accordingly, it is a principal object of the invention to provide a floating brake rotor assembly that minimizes localized deformation and decreases wear of rotor, hub and pins by incorporating non-load bearing pins and spreading load transfer forces over a greater area.

It is another object of the invention to provide a floating brake assembly that increases load transfer capacity between rotor and hub by increasing thrust face surface area between the two.

It is a further object of the invention to provide a floating brake assembly that increases thermal transfer capability between rotor and hub, thereby improving heat dissipation and lessening thermal induced distortion of the rotor.

Still another object of the invention is to provide a floating brake assembly that incorporates a configuration using a coplanar rotor and hub assembly, which minimizes or eliminates distortion due to lateral thrust.

Yet another object of the invention is to provide a floating brake assembly that incorporates pin and spring assemblies that are simple to assemble and replace.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
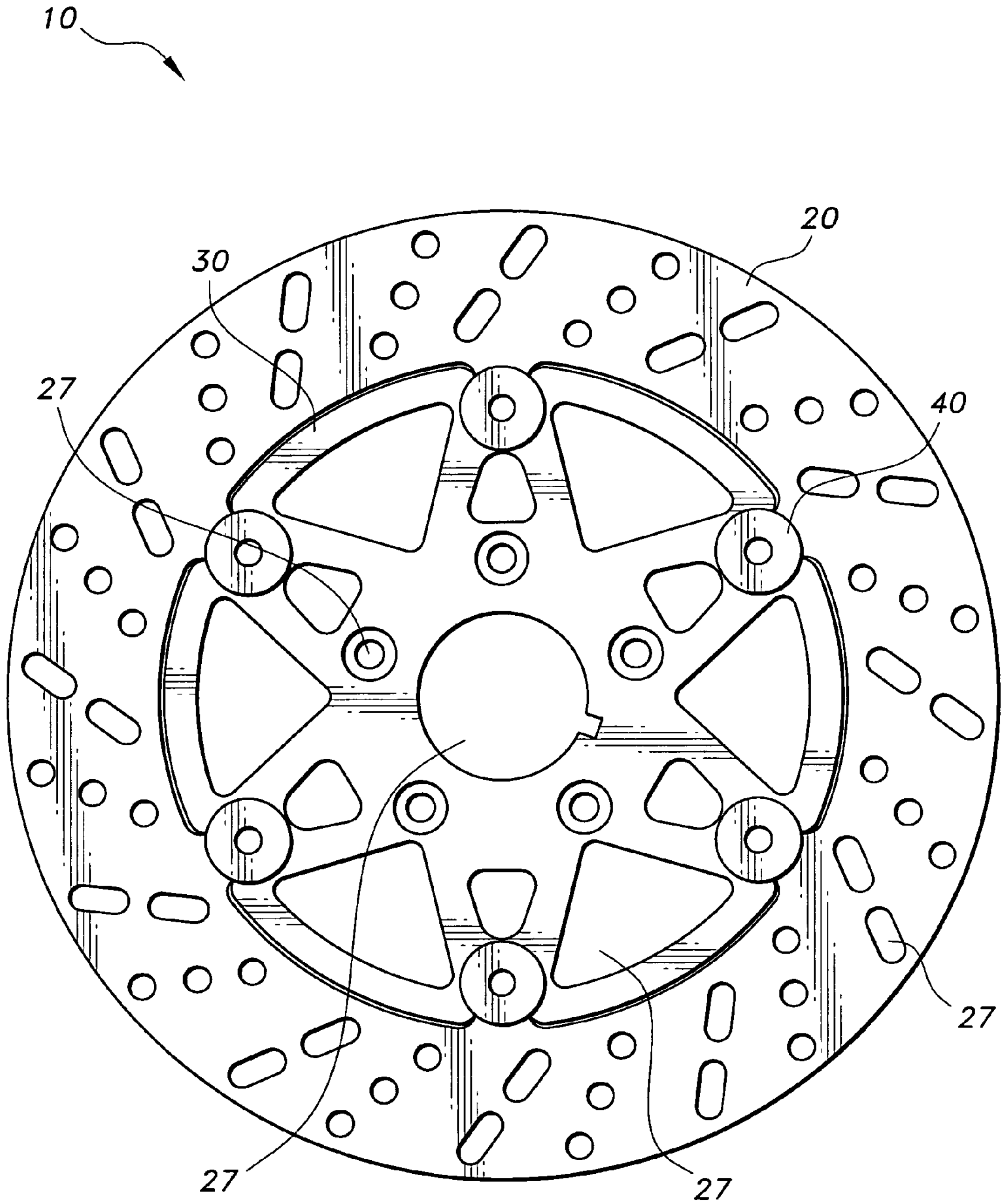
FIG. 1 is a side view of a floating brake rotor assembly with non-load bearing pins according to the present invention, the opposite side being symmetrical.
Figure 2:
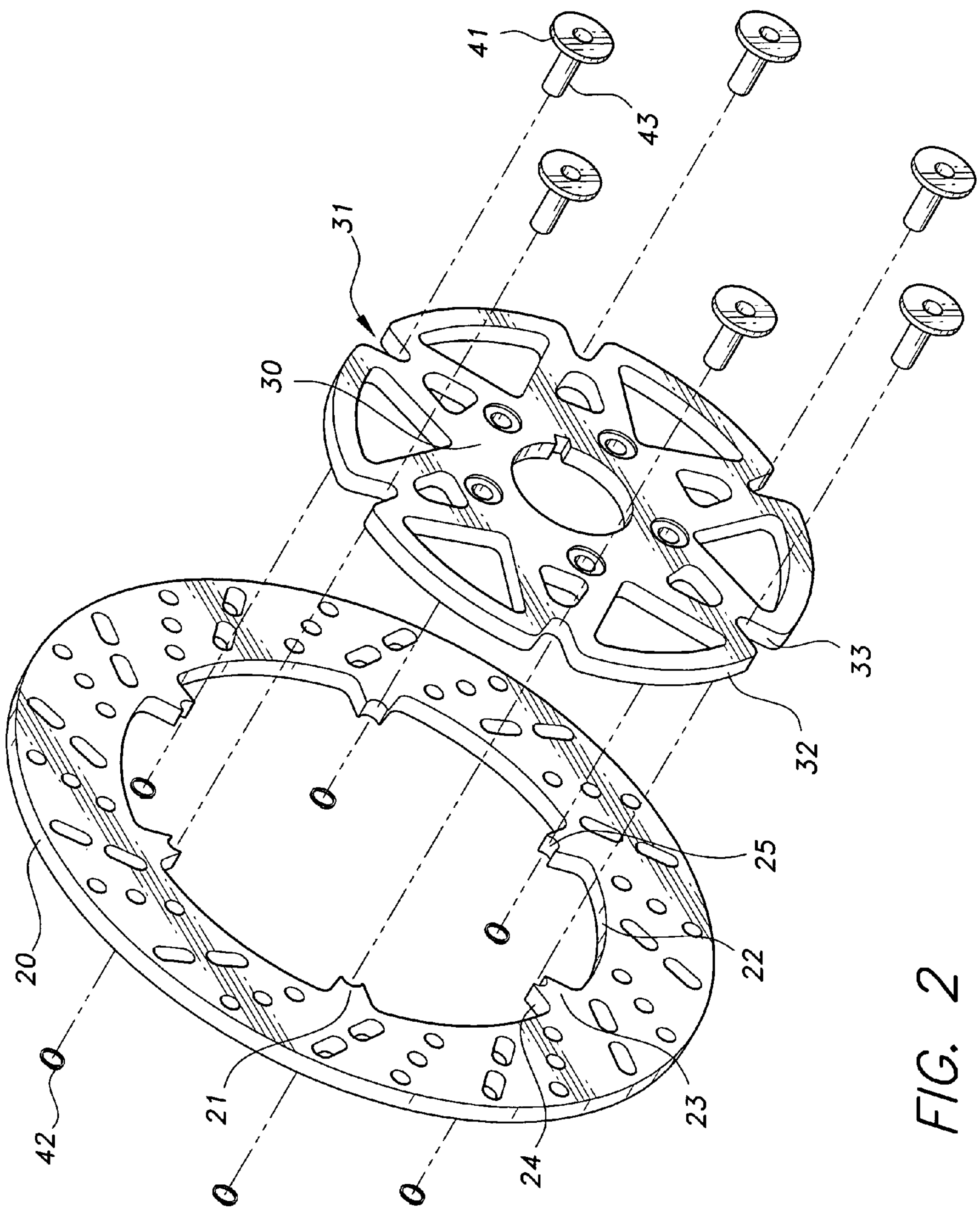
FIG. 2 is an exploded view of the floating brake assembly of FIG. 1.

The present invention is a floating brake rotor assembly with non-load bearing pins designated generally as 10 in the drawings. As shown in FIGS. 1 and 2, the invention includes a brake rotor 20 that is secured to a hub 30 by six pin and spring assemblies 40.

The brake rotor 20 is an annular disk with two opposing flat sides or faces, and six protruding members 21 or teeth extending from its 20 inner circumferential edge 22. Each protruding member 21 has two lateral faces 23 and two radially extending bearing faces 24. Each lateral face 23 is flush with the lateral faces of the brake rotor 20 and each radially extending bearing face 24 is perpendicular to the lateral faces of the brake rotor 20. The two radially extending bearing faces 24 taper toward each other from the proximal end to the distal end 25 of each protruding member 21, i.e., from the rim towards the center of the rotor 20. From a lateral perspective, the distal end 25 of each protruding member 21 is concave.

The hub 30 is substantially round and annular with two opposing flat sides or faces, and with six recesses 31 formed along its outer circumferential edge 32. Each recess 31 has two bearing faces 33 that are perpendicular to the planes in which the faces of the hub 30 lie. From the outer edge 32 of the hub 30, the two bearing faces 33 taper toward each other and meet to form a curved bottom 34. From a lateral perspective, the curved bottom 34 of the recess is concave.

Figure 3:
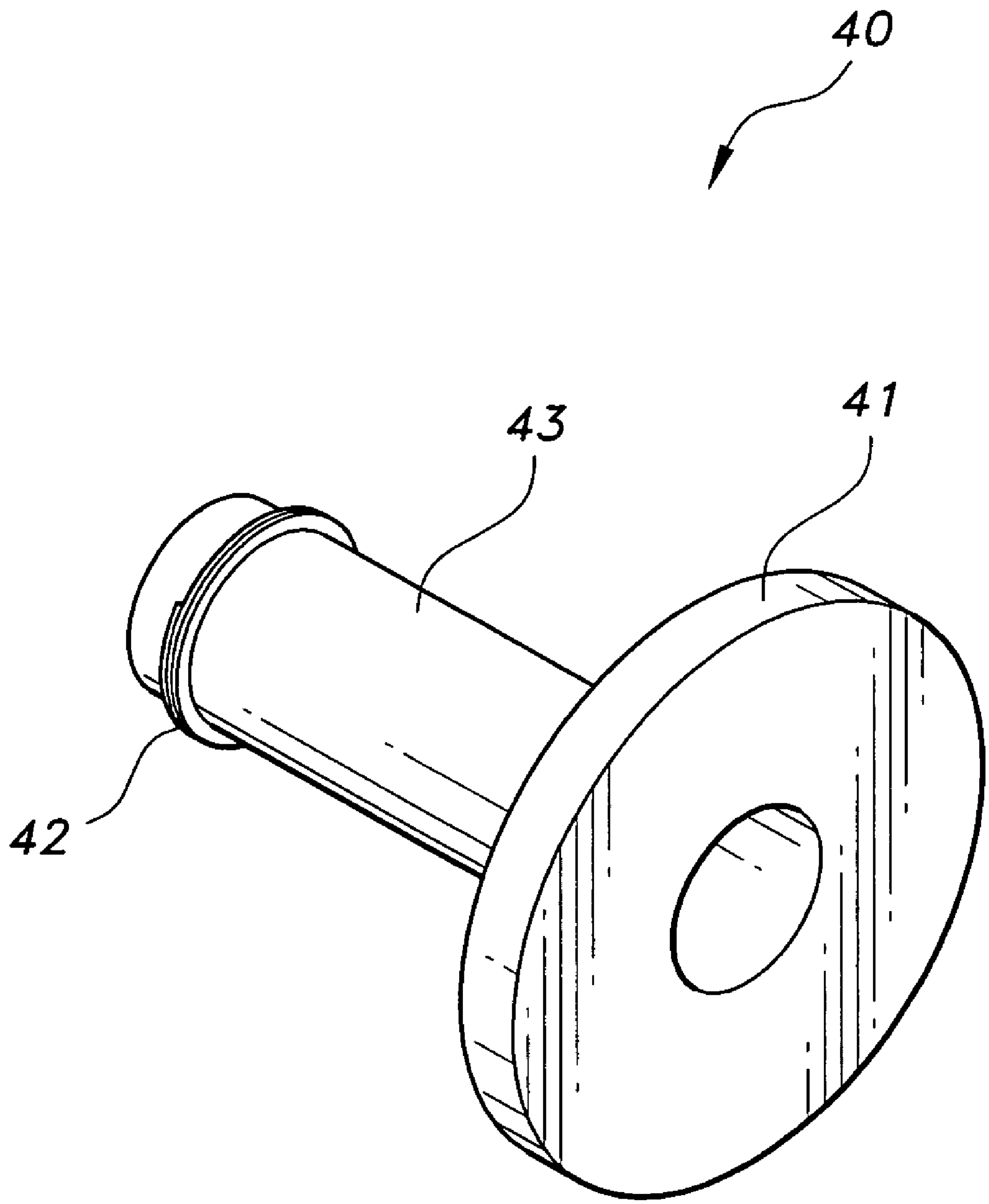
FIG. 3 is a perspective view of a pin and spring assembly for the floating brake rotor assembly according to the present invention.

Each of the six pin and spring assemblies 40, shown more particularly in FIG. 3, includes a pin having a head 41 and a shaft 43, and a spiral retaining spring 42 that is sized to fit snuggly around the pin shaft 43.

Figure 4:
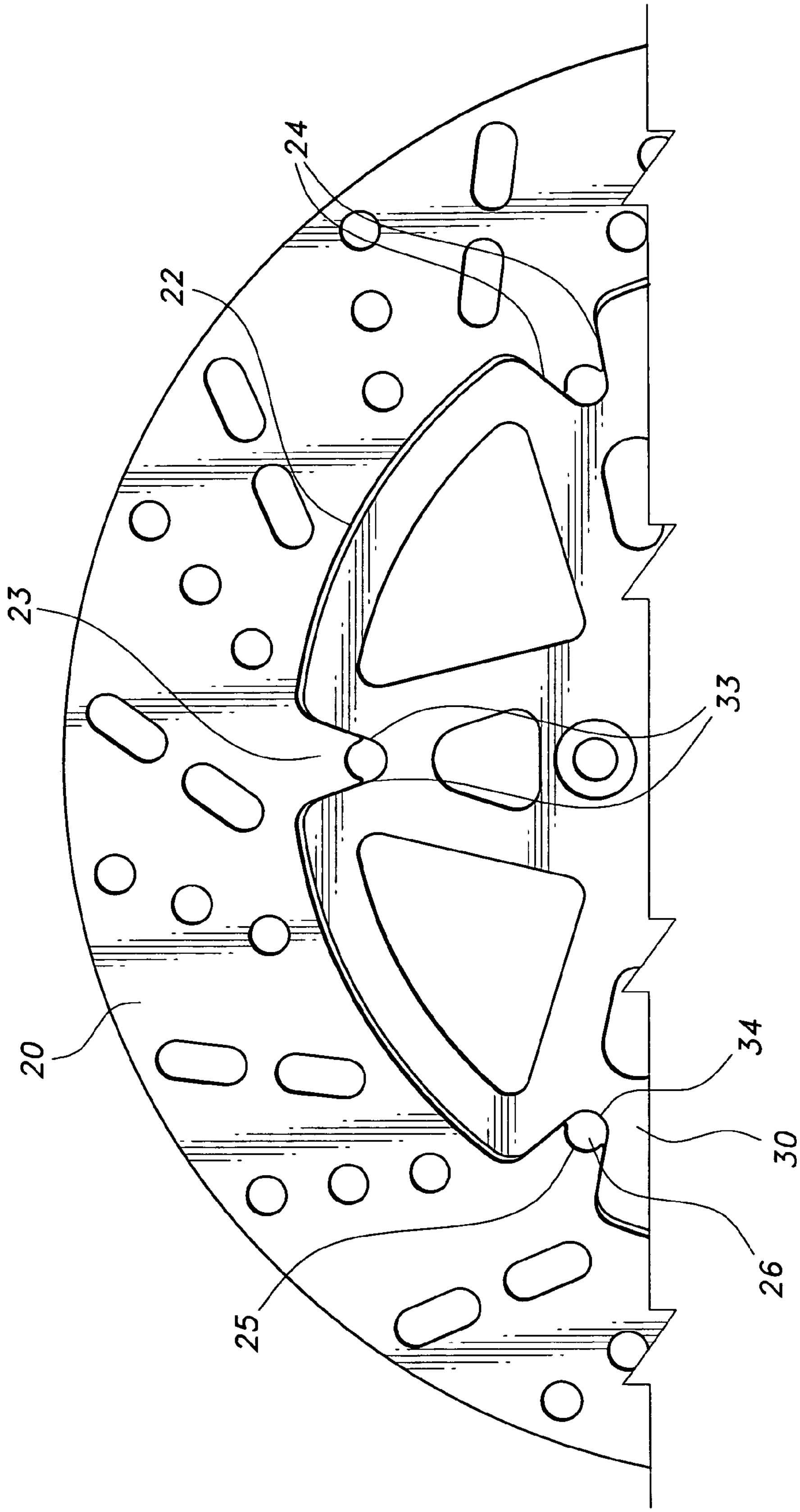
FIG. 4 is a fragmented, side elevation view of the rotor and hub for the floating brake rotor assembly, the pins not being shown in order to depict alignment of the protruding members on the rotor with indentations on the hub.

The brake rotor 20 is mounted on the hub 30 with its six protruding members 21 positioned within the six recesses 31 on the outer circumference 32 of the hub 30. The bearing faces 24 of the protruding members 21 rest flush against the bearing faces 33 of the recesses 31, thereby suspending the brake rotor 20 on the hub 30 such that the rotor 20 and hub 30 share a common axis of rotation and are substantially coplanar. Together, the distal end 25 of each protruding member 21 and the bottom 34 of its 21 corresponding recess 31 form an opening 26, as shown most clearly in FIG. 4. A pin and spring assembly 40 is disposed through each opening 26 with the head 41 of the pin on one side of the brake rotor 20 and hub 30, and with the retaining spring 42 mounted on a portion of the pin shaft 43 extending from the opposite side of the brake rotor 20 and hub 30. Instead of a retaining spring, a retainer ring may be placed on the shaft 43 to secure the pin. The pin and spring assemblies 40 secure the brake rotor 20 and hub 30 together, while at the same time allowing slight lateral movement of the brake rotor 20 relative to the hub 30.

A number of apertures 27 pass laterally through the brake rotor 20 and hub 30 to help dissipate heat, to accommodate a vehicle axle, and to allow for mounting of the assembly 10 to a wheel.

When the brake rotor assembly 10 is mounted to a vehicle wheel and brake pads are applied to the side faces of the brake rotor 20, torque force is transferred from the brake rotor 20 to the hub 30 solely via the sides 24 and 33 of the protruding members 21 and indentations 31, respectively. Hence, the pin and spring assemblies 40 do not bear any torque force transferred from the brake rotor 20 to the hub 30, and the load is transferred between rotor 20 and hub 30 primarily, if not exclusively, through the mating bearing faces of the protruding members 21 and indentations 31.

Figure 5:
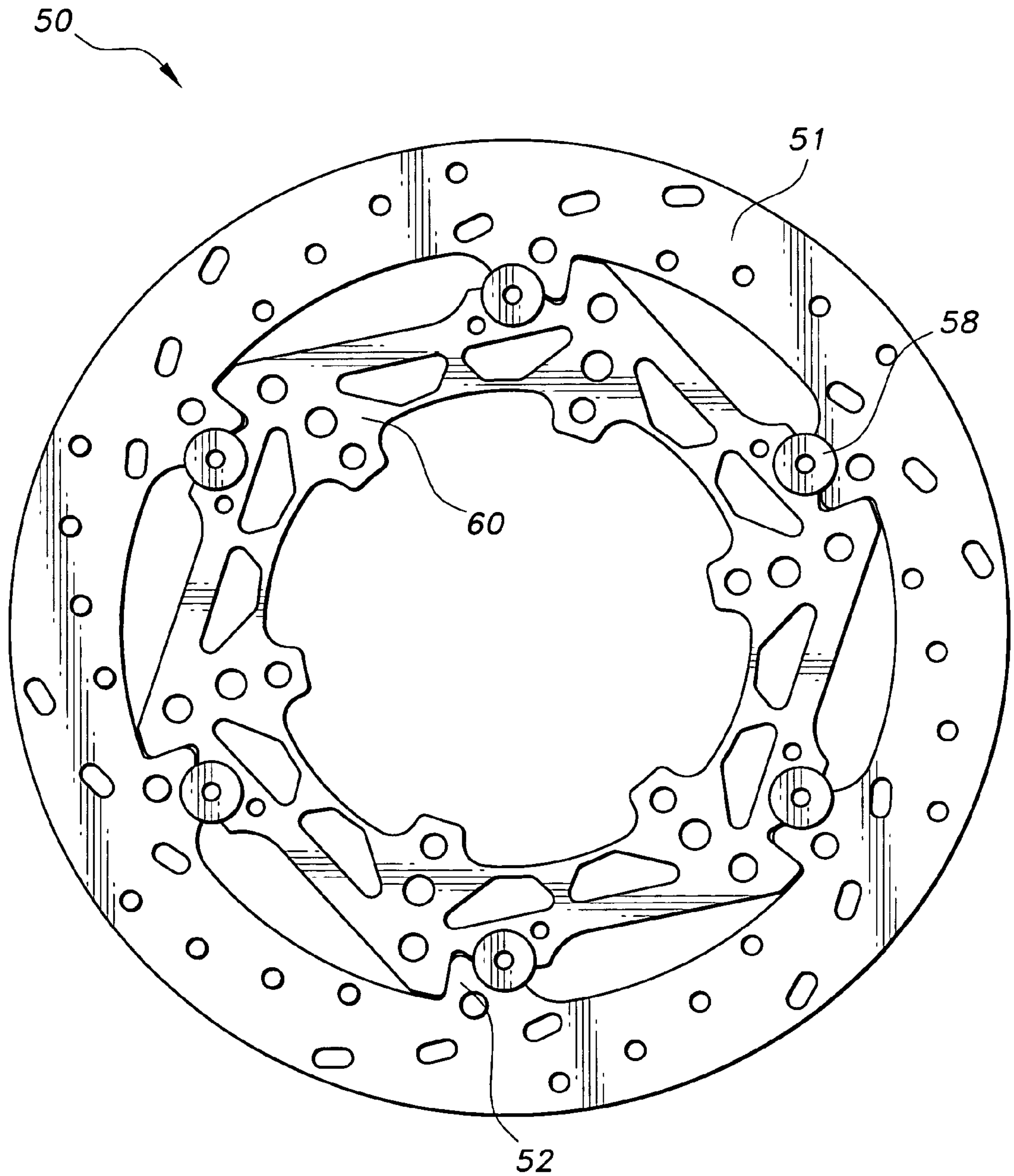
FIG. 5 is a side view of an alternative embodiment of a floating brake rotor assembly with non-load bearing pins according to the present invention.
Figure 6:
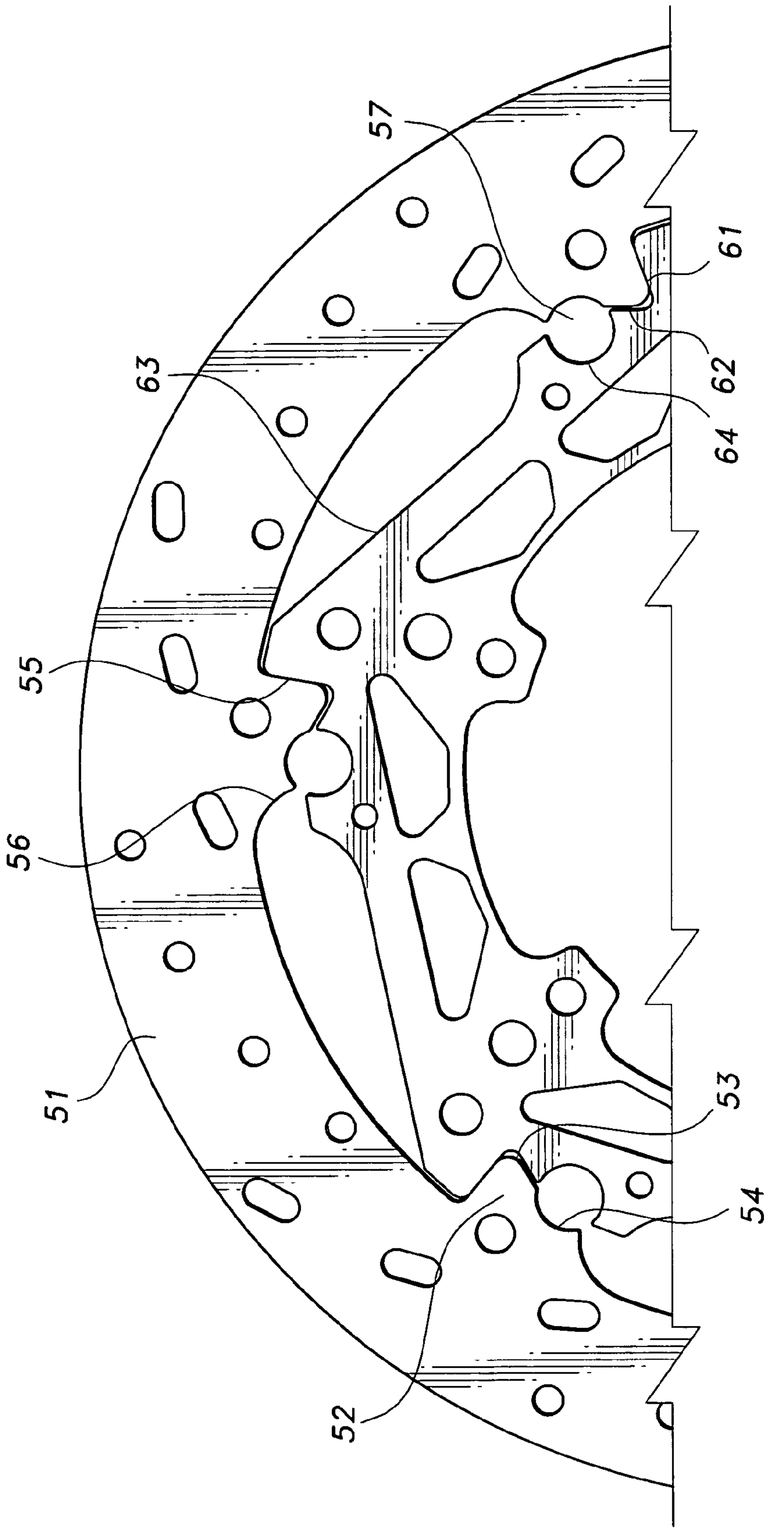
FIG. 6 is a fragmented, side view of the rotor and hub of the floating brake rotor assembly of FIG. 5, the pins being omitted in order to show alignment of protruding members on the rotor with indentations on the hub.

In an alternative embodiment, designated generally as 50 and shown in FIGS. 5 and 6, the distal end 53 of each protruding member 52 is rounded, radially extending side 55 of each protruding member 52 is substantially planar, being linear as viewed from the side of the rotor 51, and radially extending side 56 has a semi-circular cavity 54 as viewed from the side of the rotor 51. One side 61 of each of the recesses on the outer edge 63 of the hub 60 is substantially planar, being linear as viewed from the side of the hub 60, and the other side 62 of each recess has a semi-circular cavity 64, as viewed from the side of the hub 60, that mates with the cavity 54 on a corresponding protruding member 52 to form an opening 57 for a pin and spring assembly 58.

Figure 7:
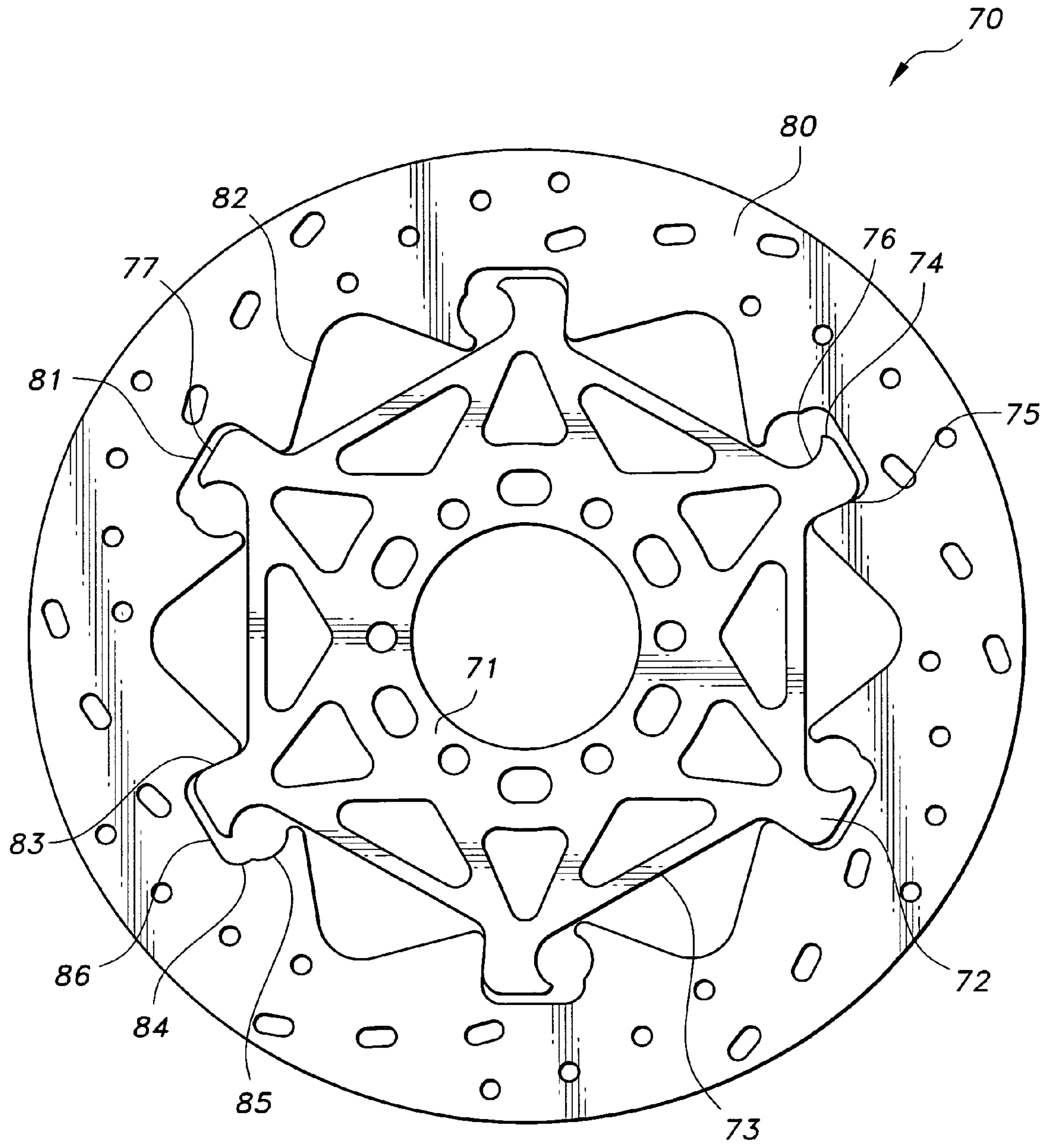
FIG. 7 is a side view of a another alternative embodiment of a floating brake rotor assembly with non-load bearing pins according to the present invention, the pins being omitted.

In a second alternative embodiment, designated generally as 70 in FIG. 7, the hub 71 has six protruding members 72 extending radially from its outer edge 73 that mate with six recesses 81 in the inner circumferential edge 82 of the brake rotor 80. Each protruding member 72 has two radially extending sides 74 and 75 that are substantially parallel to each other, the first side 75 forming a substantially planar bearing face and the opposing side 74 having a cavity 76 defined therein, so that the opposing side 74 is concave. Each recess 81 in the brake rotor 80 has two sides 83 and 84 that are substantially parallel to each other, side 83 being substantially planar in order to form a bearing face that mates with the bearing face 75 of the protruding member 72, the opposing side 84 having a cavity 85 formed therein so that side 84 is concave, the concave sides 74 and 84 being aligned to form an opening for a pin and spring assembly. The distal end 77 of each protruding member 72 and the bottom 86 of each recess 81 are substantially flat.

Both of these alternative floating brake rotor assemblies 50 and 70 are designed to work in one direction. Hence, the pin and spring assemblies of each assembly 50 and 70 are non-load bearing only when brake pads are applied to the brake rotors 51 and 80 while either brake rotor assembly 50 and 70, as shown in FIGS. 5 and 7, is spinning in a counter-clockwise rotation. Thus, these assemblies 50 and 70 are useful primarily for vehicles that are driven in only one direction, such as motorcycles.

It is to be understood that the present invention is not limited to the embodiments described above, but encompasses any and all embodiments within the scope of the following claims.

I claim:

1. A floating brake rotor assembly, comprising:

an annular hub having an outer edge and a plurality of recesses defined in the outer edge, the recesses being spaced apart radially;

each one of said recesses defining at least one mating surface;

an annular brake rotor having an inner circumferential edge and a plurality of protruding members extending radially inward from the inner circumferential edge, the protruding members of the rotor and the recesses of the hub cooperating to define pin openings therebetween when the hub is placed inside and concentrically aligned with the rotor;

each one of said protruding members defining at least one mating surface corresponding to a respective mating surface of said recesses of said hub; and a plurality of pins having a head and a shaft, the pins being inserted through the pin openings defined between the protruding members and the recesses, the head of each of the pins abutting the rotor and the hub;

said plurality of pins being non-load bearing during braking; and a retainer mounted on the shaft of each of the pins so that the hub and rotor are slightly slidable axially on the pins;

wherein load forces during braking bearing against said corresponding mating surfaces of the rotor protruding members and respective said mating surfaces of the hub recesses.

2. The floating brake rotor assembly according to claim 1, wherein:

each of said protruding members has a pair of opposed, inwardly tapering bearing faces joined by a distal end surface, the distal end being concave; and each of said recesses has two diverging bearing faces joined by a concave bottom surface, the bearing faces of said protruding members bearing against the bearing faces of said recesses, the pin opening being defined by the concave distal end of the protruding member and the concave bottom of the recess.

3. The floating brake rotor assembly according to claim 1, wherein:

each of said protruding members has opposing first and second sides, the first side having a first cavity defined therein; and each of said recesses has opposing third and fourth sides, the third side having a second cavity defined therein, the pin opening being defined by alignment of the first and second cavities.

4. The floating brake rotor assembly according to claim 1, wherein said plurality of protruding members and said plurality of recesses comprise six protruding members and six mating recesses.

5. The floating brake rotor assembly according to claim 1, wherein said brake rotor has a plurality of apertures defined therein for dissipation of heat generated during braking.

6. The floating brake rotor assembly according to claim 1, wherein said retainer comprises a spiral retaining spring.

7. The floating brake rotor assembly according to claim 1, wherein said retainer comprises a retaining ring.

8. A floating brake rotor assembly, comprising:

an annular hub having an outer edge and a plurality of protruding members extending radially from the outer edge, the protruding members being spaced apart radially;

each one of said protruding members defining at least one mating surface;

an annular brake rotor having an inner circumferential edge and a plurality of recesses defined in the inner circumferential edge, each one of said recesses defining at least one mating surface;

the protruding members of the hub and the recesses of the rotor cooperating to define pin openings therebetween when the hub is placed inside and concentrically aligned with the rotor; and a plurality of pins having a head and a shaft, the pins being inserted through the pin openings defined between the protruding members and the recesses, the head of each of the pins abutting the rotor and the hub; and a retainer mounted on the shaft of each of the pins so that the hub and rotor are slightly slidable axially on the pins;

wherein load forces during braking bearing against said corresponding mating surfaces of the hub protruding members and respective said mating surfaces of the rotor recesses, and said plurality of pins are non-load bearing during braking.

9. The floating brake rotor assembly according to claim 8, wherein each said protruding member has a planar bearing face and an opposing concave side, and each of the recesses defined in said rotor has a planar bearing face and an opposing concave side, the bearing faces of said protruding members abutting the bearing faces of the recesses and the concave sides of said protruding members, and the recesses being aligned in order to define the pin openings.

10. The floating brake rotor assembly according to claim 8, wherein said plurality of protruding members and said plurality of recesses comprise six protruding members and six mating recesses.

11. The floating brake rotor assembly according to claim 8, wherein said brake rotor has a plurality of apertures defined therein for dissipation of heat generated during braking.

12. The floating brake rotor assembly according to claim 8, wherein said retainer comprises a spiral retaining spring.

13. The floating brake rotor assembly according to claim 8, wherein said retainer comprises a retaining ring.

* * * * *